(12) United States Patent
Tozer

(10) Patent No.: US 6,634,667 B1
(45) Date of Patent: Oct. 21, 2003

(54) PINTLE HOOK CONNECTION

(75) Inventor: Warwick Brook Tozer, Eltham (AU)

(73) Assignee: Aero-Tech Pty. Ltd., Victoria (AU)

( * ) Notice: Subject to any disclaimer, the term of this patent is extended or adjusted under 35 U.S.C. 154(b) by 0 days.

(21) Appl. No.: 09/913,734

(22) PCT Filed: Feb. 17, 2000

(86) PCT No.: PCT/AU00/00111
§ 371 (c)(1),
(2), (4) Date: Aug. 17, 2001

(87) PCT Pub. No.: WO00/48852
PCT Pub. Date: Aug. 24, 2000

(30) Foreign Application Priority Data

Feb. 17, 1999 (AU) .................................. PP8736

(51) Int. Cl.[7] ................................. B60D 1/04
(52) U.S. Cl. ..................... 280/514; 280/507; 280/498
(58) Field of Search ............... 280/489, 495, 280/498, 504, 507, 514; 180/14.1

(56) References Cited

U.S. PATENT DOCUMENTS 3,823,962 A * 7/1974 Martin, Jr. ................. 280/504
4,379,569 A * 4/1983 Koch ......................... 280/504
5,332,250 A * 7/1994 Thorwall et al. ........... 280/504
6,139,043 A * 10/2000 Gries et al. ................. 280/504

FOREIGN PATENT DOCUMENTS

EP       0 301 153 A1      2/1989

* cited by examiner

Primary Examiner—Lesley D. Morris
Assistant Examiner—Matthew Luby
(74) Attorney, Agent, or Firm—Sughrue Mion, PLLC

(57) ABSTRACT

A connection (1) for a pintle hook tow point having a rearwardly and upwardly extending horn, and which extends rearwardly from a forward mounting plate of the pintle hook tow point. A bracket (2) of the connection (1) carries a transverse roller (3) mounted for rotation about an at eccentric axis. The roller (3) is connected to a handle (11) by which it can be rotated to vary the distance between the side of the roller and forward end feet (12, 13) of the bracket (2). For use, the bracket (2) is placed over the horn, and the feet (12, 13) are urged against the mounting plate of the pintle of the hook tow point or another fixed surface. By this, the connection (1) is locked on the pintle hook tow point.

16 Claims, 5 Drawing Sheets

PINTLE HOOK CONNECTION

This is a National Stage entry under 35 U.S.C. § 317 of Application No. PCT/AU00/00111 filed Feb. 7, 2000, and the complete disclosure of which is incorporated into this application by reference.

BACKGROUND OF THE INVENTION

This invention relates to connections adapted to engage with a pintle hook tow point of the kind used for towing trailers and the like.

Pintle hook tow points are used for connections between vehicles and trailers mainly in heavy duty and off road applications. A large user of pintle hooks are defence forces. Although there are variations between pintle hooks from various manufacturers they share a common mode of operation. Most pintle hooks are characterised by a horn having an upwardly directed end over which a loop or ring on a trailer draw bar is placed. A mechanism is provided to close the open part of the hook so as to provide a captive eyelet for the ring or loop which permits a large degree of relative movement in two planes. Whilst this movement is desirable for trailer towing there are some applications in which movement is not required. One such application arises in connection with devices for collecting debris from a surface of the kind described in International Patent Applications WO96/09440 and WO98/29609 by the present applicant. Devices of this kind are required to be towed across a surface from a towing point positioned close to the surface over which the vehicle is driven. This is achieved by providing a tow hitch that depends downwardly from the towing point of the vehicle used to tow the collecting device. In the case of most tow points it is possible to establish a connection between the towing point which does not provide for any substantial movement. The risk of the depending hitch striking an obstruction or the ground due to unevenness in the surface is accommodated by providing a spring loaded mechanism within the hitch device itself. A difficulty arises however when it is desired to connect this type of depending tow hitch to a vehicle fitted with a pintle hook towing point. This can be a particular difficulty because the debris collection devices are adapted for collection of fine objects from airport surfaces. Many airports are maintained by defence forces which have vehicles provided with a pintle hook tow point.

SUMMARY OF THE INVENTION

It is an object of this invention to provide a connection for a pintle hook tow point that will provide a substantially rigid mounting point with respect to the vehicle.

Accordingly, in one aspect this invention provides a connection for a pintle hook tow point of a vehicle comprising a transverse member for engagement with the horn of the pintle hook tow point, a bracket mounting said transverse member and extending for engagement with a surface which is in use of the connection fixed with respect to the vehicle, and selectively operable locking means for acting between the said engagement and said transverse member to clamp the connection between the fixed surface and an inner rear surface of the horn.

The fixed surface may comprise, for example, a surface on the vehicle, such as a rear surface, a mounting plate or other mounting of the pintle hook tow point, or one or more surfaces on fixing elements for attaching the pintle hook tow point to the vehicle.

Preferably, the bracket includes spaced apart protuberances to respectively engage lateral sides of the pintle hook tow point or latch to further stabilise the connection. In the preferred form these protuberances can be made adjustable, for example by taking the form of threaded bolts with lock nut arrangements.

The transverse member is preferably a cylindrical element. A groove or depression is preferably formed in the central region of the transverse member so as to provide for a more stable engagement with the inner rear surface of the horn. In an alternative configuration a resiliently deformable material can be used for the cylindrical element so that it at least partially conforms to the shape of the inner rear surface of the horn under load.

The selectively operable locking means is preferably formed by the transverse member being eccentrically mounted on an axle. An arm, or pair of arms can be used to rotate the eccentrically mounted transverse member so as to increase the distance between the surface of the member bearing against the inner surface of the horn and the extension of the bracket bearing against the vehicle or pintle hitch mounting plate. The arm or arms are preferably provided with means to lock them in an engaged position. This is preferably achieved by providing an appropriate stop on the bracket against which the arms bear and an aperture through which a locking pin or the like can be inserted.

In order to provide for use of the connection with a wide range of pintle tow points the transverse member is preferably mounted for movement with respect to a slotted aperture within the bracket so as to allow a coarse adjustment of the distance between the member and the surface of the bracket which in use bears against said fixed surface. The bracket is preferably of a generally U-shaped form with an open end for bearing against the fixed surface and a closed end for fitting behind the horn. A connection point for the attachment point for the article to be used with the connection is preferably formed by a rearward extension from the closed end. The transverse member thus extends between and is mounted through two arms of the U-shaped bracket.

It will be apparent that the connection for a pintle tow point of this invention thus provides a substantially rigid mounting for implements such as the tow hitch associated with the applicant's foreign object debris collection device. The connection is adjustable to accommodate variations between different types of pintle hook tow points and can be simply and quickly installed and removed from the pintle hook tow point.

BRIEF DESCRIPTION OF THE DRAWINGS

One embodiment of the invention will now be described, by way of example only, with reference to the accompanying drawings in which.

DETAILED DESCRIPTION OF THE INVENTION

Figure 1:
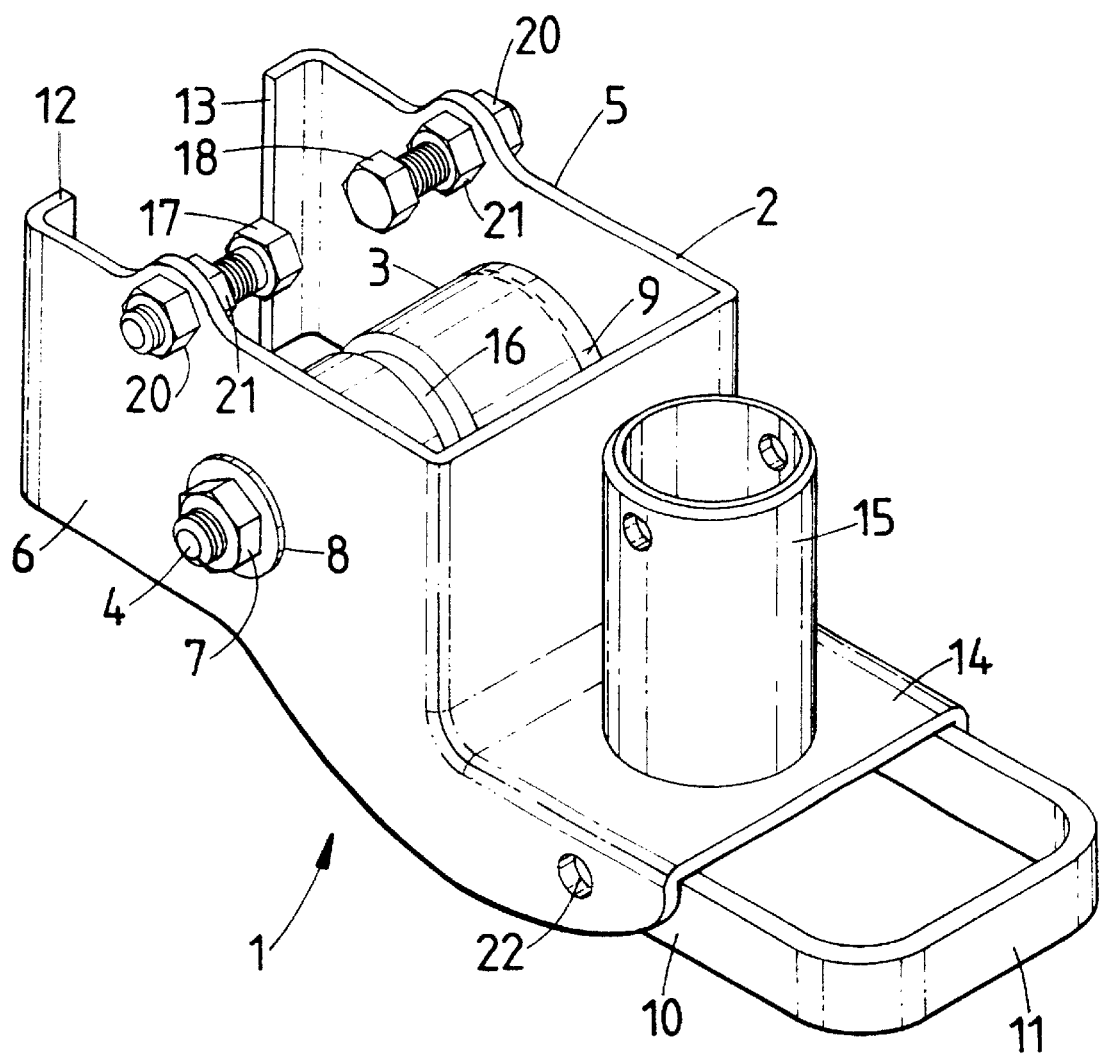
FIG. 1 is a perspective view of a connection for a pintle hook tow point.

As shown in the drawings the connection 1 for a pintle hook tow point according to this invention includes a generally U-shaped bracket 2 in which a transverse roller 3 is mounted. The roller 3 is eccentrically mounted on an axle 4 that extends between the two arms 5, 6 of the U-shaped bracket 2. The eccentric mounting is achieved by simply having the hole through the roller 3 off-centre with respect to its axis of symmetry. Axle 4 takes the form of a bolt with a threaded end to receive a nut 7 and washer 8. The apertures 30 through which the axle 4 passes are slotted so as to provide for adjustment of the position of the roller 3. A pair of arms 9, 10 are provided for rotation of roller 3 and extend to form a handle 11. The open end of bracket 2 includes inturned feet 12, 13 for abutment with the vehicle chassis or mounting plate of the pintle tow point (not shown). As will be apparent from the description of the operation of the connection below these feet 12, 13 bear against any rigid surface or surface attached to the vehicle. Thus they can bear against the vehicle chassis itself or the mounting flange or heads of bolts passing through the mounting flange of the pintle hook tow point. In some applications a resilient deformable pad can be fitted to the feet.

A connection element for the tow hitch that is used with the foreign object collection device described in the aforementioned International Patent Applications WO96/09440 and WO98/29609 provided at the rear side of bracket 2 by extension 14 and a cylindrical sleeve 15.

Figure 2:
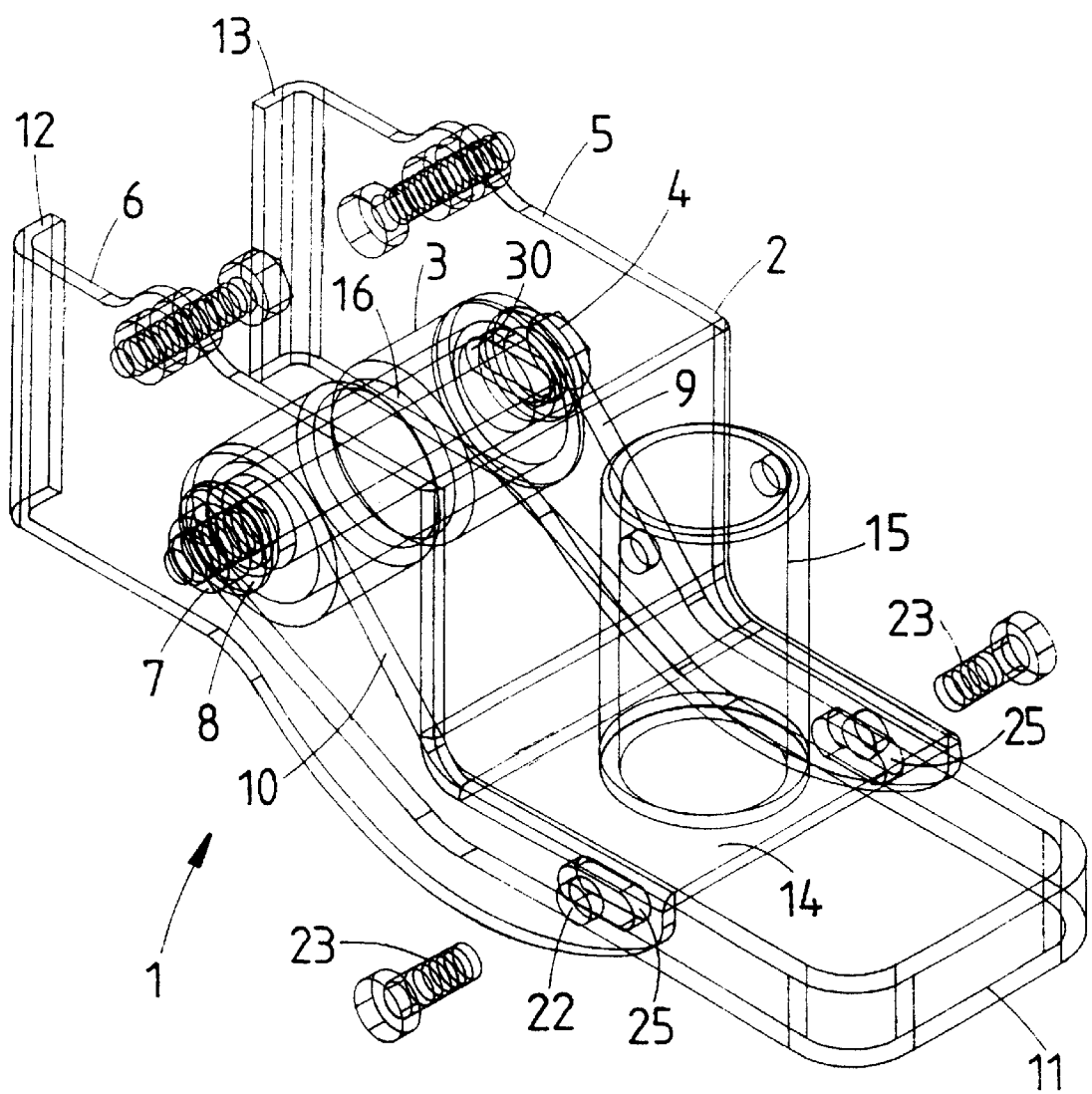
FIG. 2 is a wire frame drawing corresponding to FIG. 1.
Figure 3:
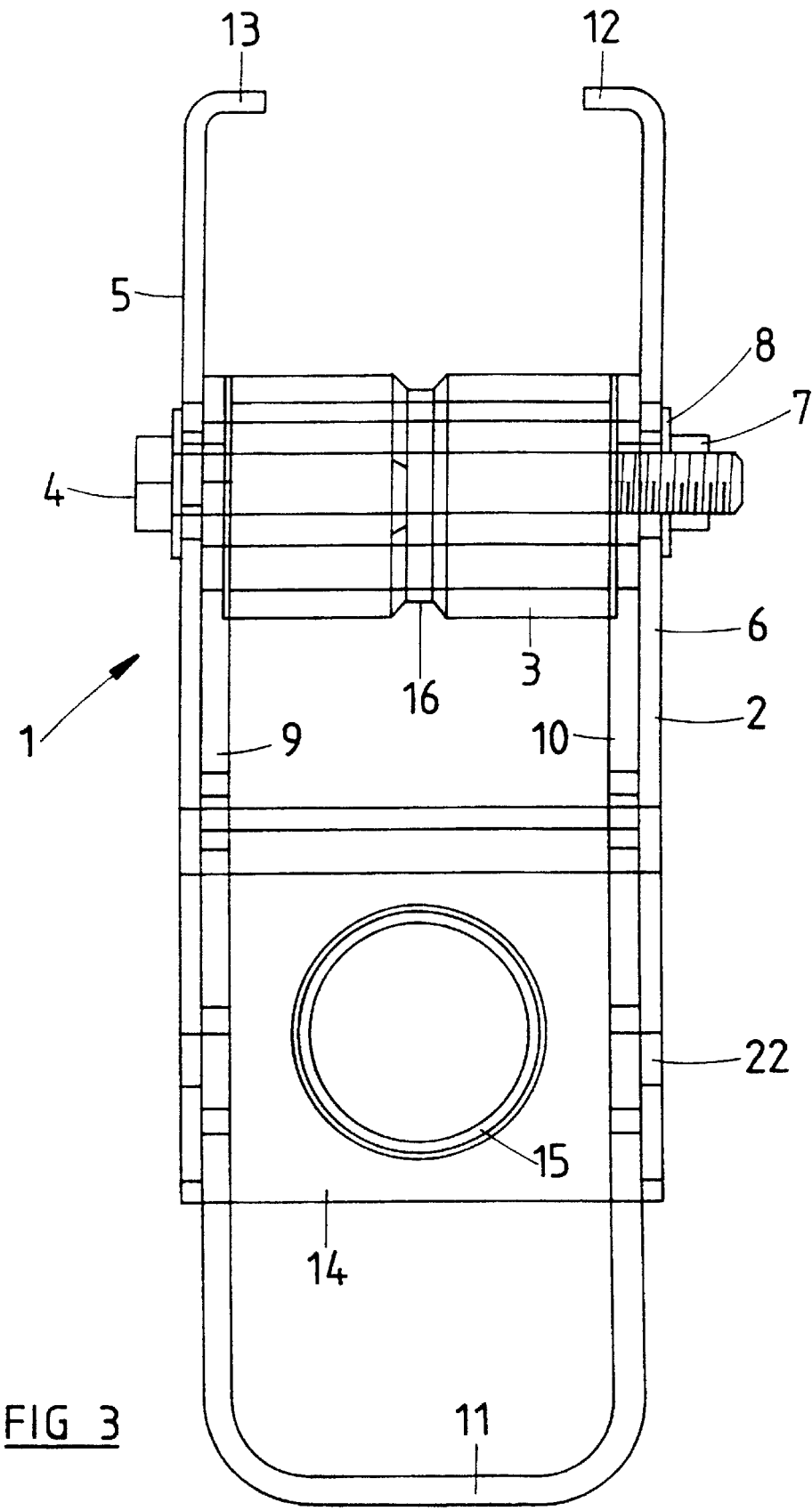
FIG. 3 is an underside view of the connection shown in FIG. 1.

The centre of roller 3 has a circumferential groove 16. This is provided so that the two adjacent edges of the groove 16 make contact with the inner surface of the horn of the pintle hook (not shown in FIGS. 1 to 3). It will be apparent that this provides a more stable engagement than a single point of contact on the surface of the roller 3.

A pair of adjustable stop bolts 17, 18 extend inwardly from the arms of bracket 2. The stop bolts are provided with engaging nuts 20, 21 on either side of the bracket 2 so that their length can be readily adjusted.

In use the connection 1 of this invention is fitted to a pintle hook tow point in the following manner. Firstly, the axle 4 is loosened and the handle 11 allowed to hang downwardly. It will be apparent that the roller 3 and arms 9, 10 arrangement are configured such that when the handle 11 is depending downwardly the eccentric mounting of the roller 3 is such that the rear surface of the roller 3 is at its closest point in its rotational position to the feet 12, 13. That is, upward movement of the handle 11 to the position shown in FIG. 1 results in an increase in the distance between the feet 12, 13 and the remote side of roller 3. With the handle 11 depending, the bracket 2 is placed over the pintle hook tow point such that the roller 3 is received on the inner surface of the horn of the pintle hook. Stop bolts 17, 18 are adjusted so as to respectively engage either lateral side of the pintle hook and prevent transverse movement of the bracket 2. The feet 12, 13 are held against the vehicle, or more commonly the mounting plate or bolts of the pintle hook tow point. Axle 4 is moved away from the feet 12, 13 to about the inner surface of the horn of the pintle hook. The axle 4 is then locked in position by tightening nut 7. The foregoing operations are for the initial fitting of the connection to a particular vehicle since for subsequent fittings these adjustments will already have been made.

Having made these adjustments the handle 11 is rotated upwardly to the position shown in FIG. 1. This results in the eccentric mounting of the roller 3 causing the distance between the feet 12, 13 and remote surface of the roller to increase so that the feet 12, 13 are pushed hard against the supporting surface and the roller 3 is pushed hard against the inner surface of the horn of the pintle hook. This secures the connection in position. Lock pins 23 may be passed through apertures 22 in bracket 2 and elongate apertures 25 in arms 9, 10 (FIG. 2) to lock handle 11 with respect to bracket 2.

In this way the connection is rigidly attached to the pintle hook and cylindrical sleeve 15 provides a rigid mounting point for connection of articles such as for example a tow hitch for the applicant's foreign object debris collecting device.

Figure 4:
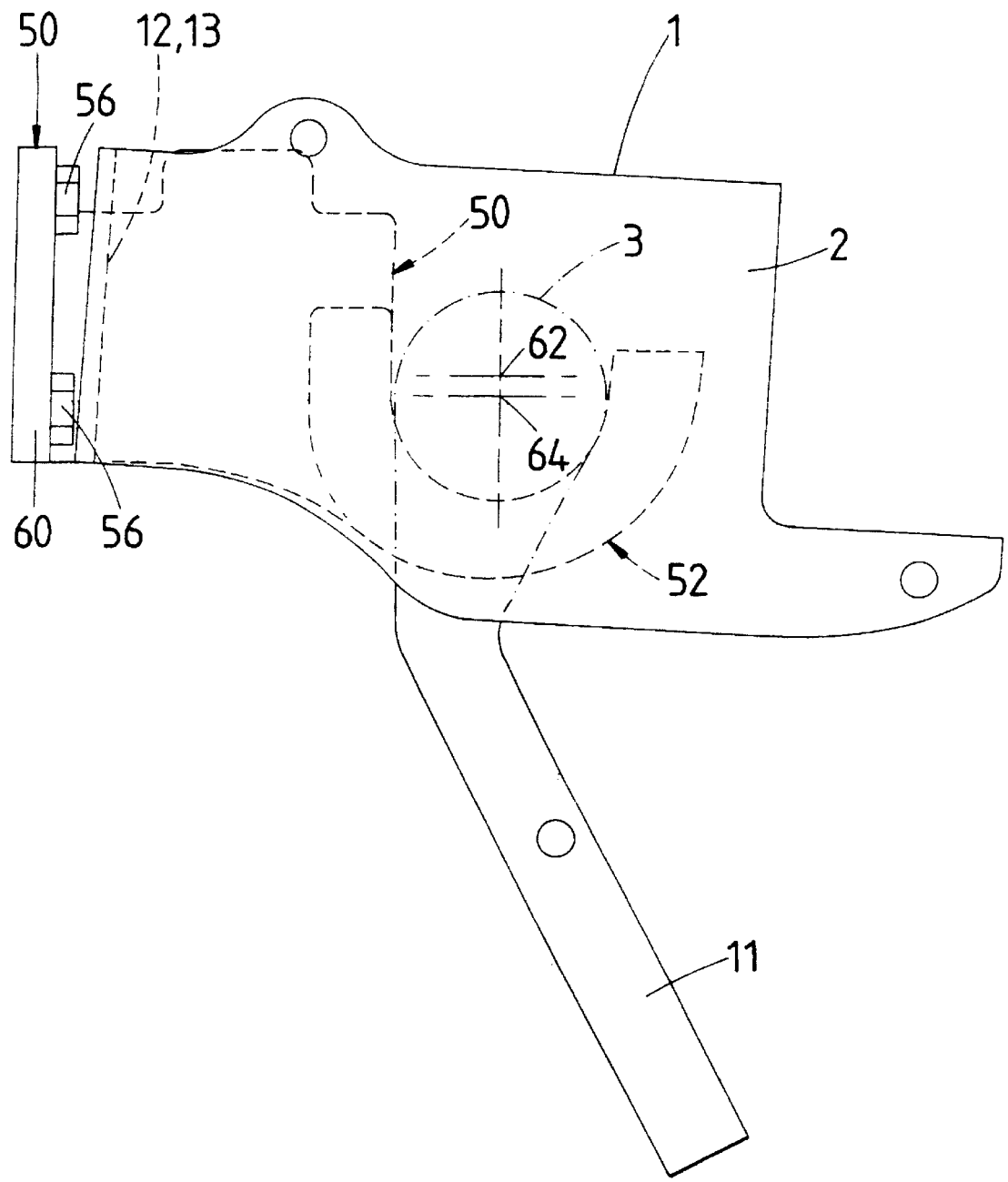
FIGS. 4 and 5 are side views of the connection of FIGS. 1 and 2, and an associated pintle hook tow point, respectively in released and locked conditions.
Figure 5:
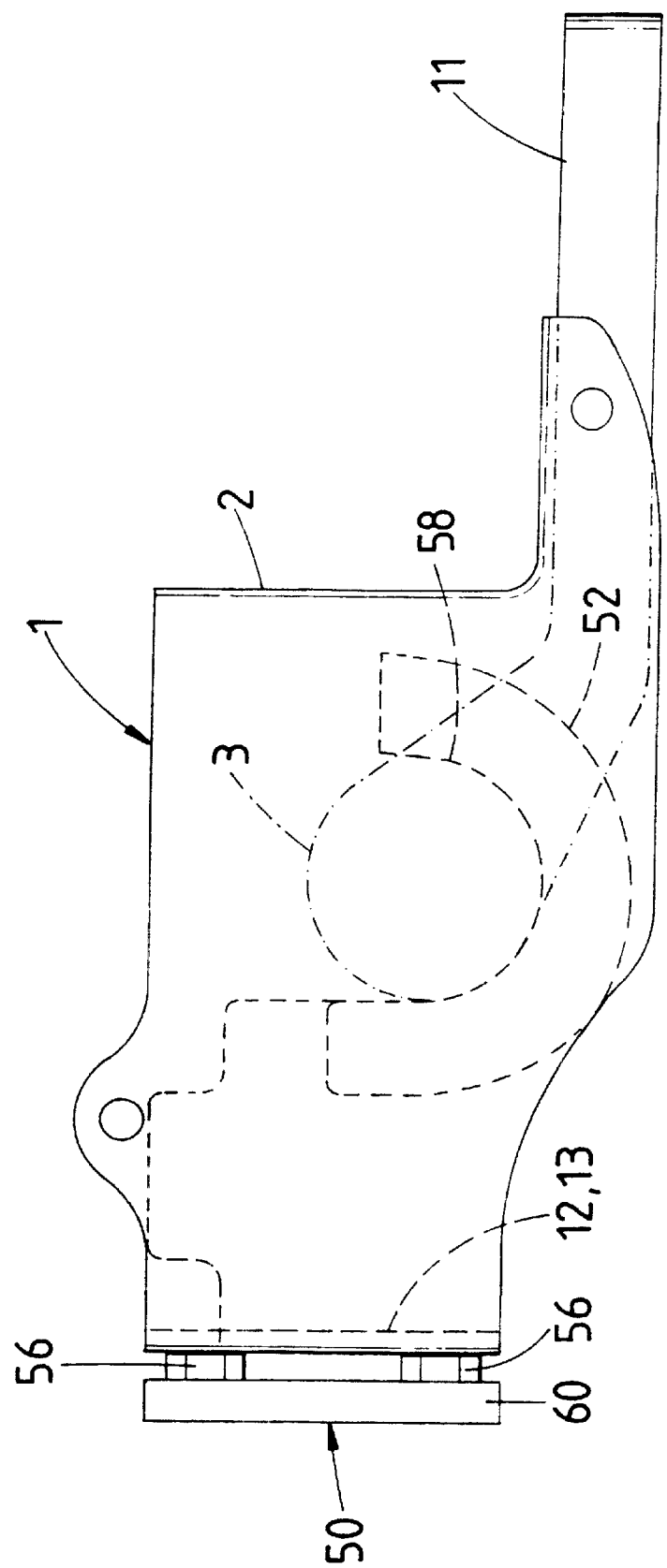

FIG. 4 illustrates the connection 1 in a condition where it is in position on, but not locked to a pintle hook 50. Here, the generally U-shaped and upwardly open horn 52 of the pintle hook accommodates the roller 3, and the feet 12, 13 are adjacent an upright rear pintle plate 60. Plate 60 forms part of the pintle hook and is attached to the rear of a vehicle (not shown) by bolts 56 which extend through the pintle plate 60. FIG. 5 shows the connection 1 in the locked condition, where the lever 11 is rotated upwardly to cause the roller 3 to bear against the inner rear surface 58 of the upstanding horn 52. By this, the bracket 2 is, relatively, moved forwardly so that the feet 12, 13 are pressed into firm engagement with bolts 56.

The location of the axis of rotation of the roller 3 is shown at 62 in FIG. 4. This is slightly eccentric with respect to the axis of symmetry 64, of the roller 3.

While, as illustrated, the connection, when fixed in position, bears against the end surfaces of the bolts 56, it may of course be arranged to bear against any other surface fixed with respect to the vehicle, such as a rear surface of the vehicle, or a rear surface of the pintle plate 60. In the described arrangement, the fixed surface is forward of the surface 58 of the horn 52.

The foregoing describes only one embodiment of the invention and modifications can be made without departing from the spirit and scope of the invention. For example, the handle operation can be reconfigured to operate from above the connection. In other variations of the invention movement of the roller is replaced by means to extend the feet to provide the required engagement. In one particular form this can be achieved by adjustable threaded members extending through the feet. In configurations of this type the roller may be replaced, for example, with a member of semi-circular cross section.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A connection for a pintle hook tow point of a vehicle comprising a transverse member for engagement with a horn of the pintle hook tow point, said transverse member being mounted on a bracket engagable with a surface fixed with respect to the vehicle, and selectively operable locking means for acting between said transverse member and the fixed surface, when engaged by the bracket, for clamping the connection between the fixed surface and an inner rear surface of the horn, wherein the bracket includes spaced apart protuberances to respectively engage lateral sides of the pintle hook tow point or latch to further stabilise the connection.

2. A connection as claimed in claim 1, wherein said protuberances are adjustable.

3. A connection as claimed in claim 2, wherein said protuberances are in the form of threaded bolts with lock nut attangements.

4. A connection for a pintle hook tow point of a vehicle comprising a transverse member for engagement with a horn of the pintle hook tow point, said transverse member being mounted on a bracket engagable with a surface fixed with respect to the vehicle, and selectively operable locking means for acting between said transverse member and the fixed surface, when engaged by the bracket, for clamping the connection between the fixed surface and an inner rear surface of the horn, wherein the transverse member is a cylindrical element, and wherein a groove or depression is formed in the central region of the transverse member for stabilising the engagement with the inner rear surface of the horn.

5. A connection as claimed in claim 4, wherein the cylindrical element is at least partially resilient so that it at least partially conforms to the shape of the inner rear surface of the horn under load.

6. A connection for a pintle hook tow point of a vehicle comprising a transverse member for engagement with a horn of the pintle hook tow point, said transverse member being mounted on a bracket engagable with a surface fixed with respect to the vehicle, and selectively operable locking means for acting between said transverse member and the fixed surface, when engaged by the bracket, for clamping the connection between the fixed surface and an inner rear surface of the horn, wherein the selectively operable locking means is formed by the transverse member being eccentrically mounted on an axle.

7. A connection as claimed in claim 6, wherein an arm, or part of arms is provided to rotate the eccentrically mounted transverse member so as to increase the distance between the surface of the member bearing against the inner rear surface of the horn and the extension of the bracket in use bearing against the fixed surface.

8. A connection as claimed in claim 7, wherein the arm or arms are provided with means to lock them in an engaged position.

9. A connection as claimed in claim 8, wherein a stop is provided on the bracket against which the arms bear and an aperture through which a locking pin or the like can be inserted.

10. A connection for a pintle hook tow point of a vehicle comprising a transverse member for engagement with a horn of the pintle hook tow point, said transverse member being mounted on a bracket engagable with a surface fixed with respect to the vehicle, and selectively operable locking means for acting between said transverse member and the fixed surface, when engaged by the bracket, for clamping the connection between the fixed surface and an inner rear surface of the horn, wherein the transverse member is mounted for movement with respect to a slotted aperture within the bracket so as to allow a coarse adjustment of the distance between the member and the surface of the bracket which in use bears against the fixed surface.

11. A connection for a pintle hook tow point of a vehicle comprising a transverse member for engagement with a horn of the pintle hook tow point, said transverse member being mounted on a bracket engagable with a surface fixed with respect to the vehicle, and selectively operable locking means for acting between said transverse member and the fixed surface, when engaged by the bracket, for clamping the connection between the fixed surface and an inner rear surface of the horn, wherein the bracket is of a generally U-shaped form with an open end for against the fixed surface, and a closed end for fitting behind the horn.

12. A connection as claimed in 11, wherein a connection point for the attachment of an article to be used with the connection is formed by a rearward extension of the bracket extending from the closed end.

13. A connection as claimed in claim 12, wherein the transverse member extends between and is mounted through two arms of the U-shaped bracket.

14. A connection for a pintle hook tow point of a vehicle comprising a transverse member for engagement with a horn of the pintle hook tow point, said transverse member being mounted on a bracket engagable with a surface fixed with respect to the vehicle, and selectively operable locking means for acting between said transverse member and the fixed surface, when engaged by the bracket, for clamping the connection between the fixed surface and an inner rear surface of the horn, the transverse member being mounted for rotation with respect to the bracket for effecting said clamping and wherein the transverse member has an eccentric portion which, under rotation of a transverse member, is rotated to effect said clamping by increasing said distance between said fixed surface, where engaged by the bracket, and said inner rear surface of the horn.

15. A connection as claimed in claim 14, wherein the transverse member is cylindrical and mounted for rotation about an axis which is eccentric with respect to the axis of the transverse member.

16. A connection as claimed in claim 15, wherein the transverse member is mounted for movement with respect to a slotted aperture of the bracket so as to allow a coarse adjustment of the distance between the member and fixed surface where engaged by the bracket.

* * * * *